United States Patent Office 3,342,551
Patented Sept. 19, 1967

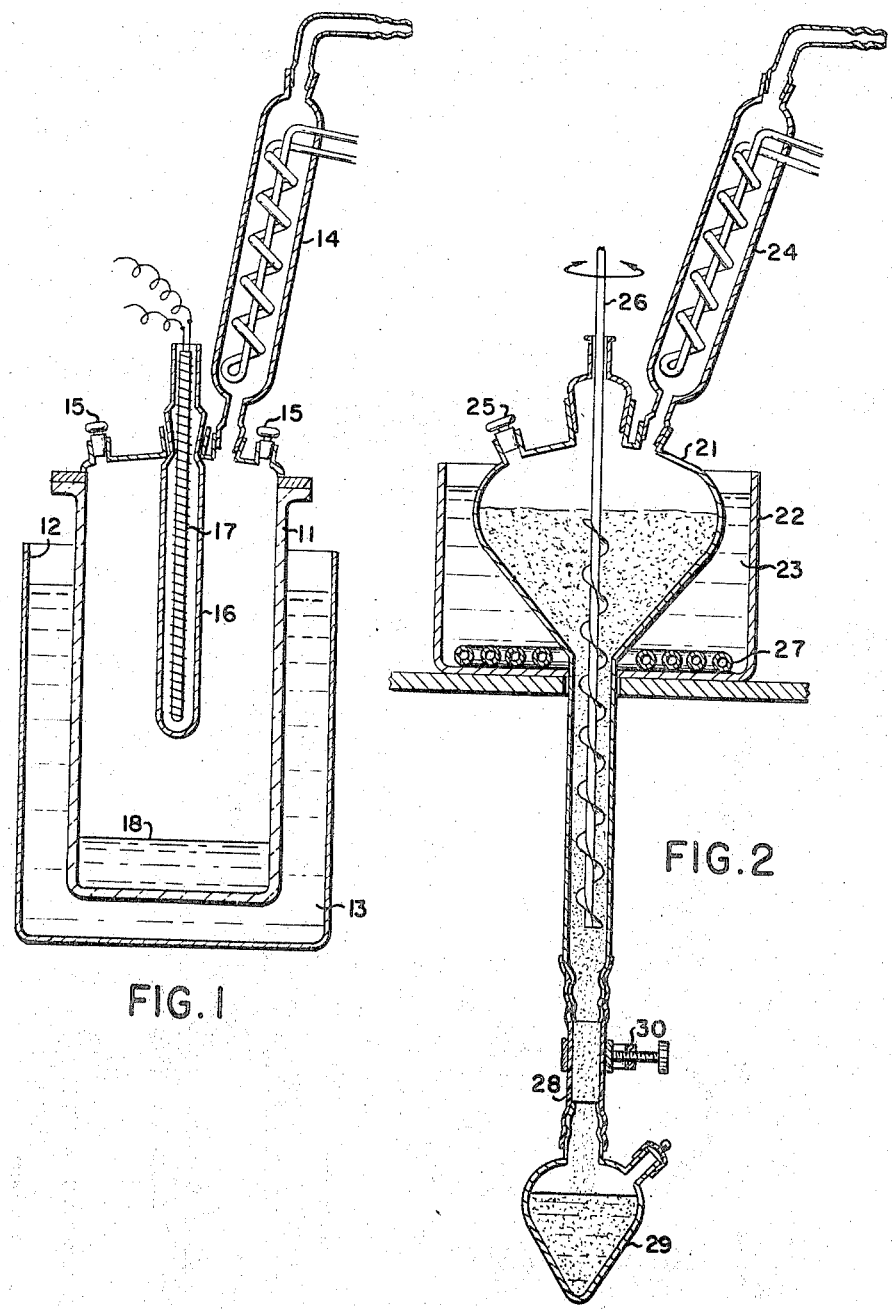

3,342,551
METHOD AND APPARATUS FOR PRODUCING A SEMICONDUCTING COMPOUND OF TWO OR MORE COMPONENTS
Richard Dötzer, Nurnberg, Germany, assignor to Siemens-Schuckertwerke Aktiengesellschaft, Berlin-Siemensstadt, Germany, a corporation of Germany
Filed Sept. 28, 1961, Ser. No. 141,488
Claims priority, application Germany, Sept. 28, 1960, S 70,592
11 Claims. (Cl. 23—204)

My invention relates to a method of producing a semiconducting compound having two or more components by thermal reduction. The thermal reduction is carried out in such a manner that compounds of at least one of the components is employed as alkyl and compounds of the other components are employed as halogenide and/or in elemental form. In particular, the method can also be performed when all components are introduced as alkyls. In general it is advisable to introduce the alkyls or the alkyls with the halogenides and/or elements in the molar ratio 1:1. When it is desired to dope the compound to be produced, the doping substances can also be introduced as alkyls, and/or halogenides and/or alkyl halogenides and/or alkyl hydrides and/or elements.

According to one of the specific embodiments of the invention, the semiconducting compound is obtained in compact form from the gaseous phase of the compound mixture of the components and, as the case may be, of the doping substances. In this case, the procedure is such that the mixture is thermally reduced in the synthesis equipment, at a location which is heated at least to the dissociation temperature of the thermally most stable compound. At this locality, the compound is precipitated in crystalline form. At least a portion of the component compounds may be mixed in liquid phase and this liquid converted into the vaporous phase by supply of heat. However, the compounds of the components and doping substances may also be individually converted into the gaseous phase and then mixed. The method is particularly suitable for the production of relatively thin layers or coatings of semiconducting compounds.

There are known methods for precipitating semiconductor substances. Semiconducting elements are precipitated from the gaseous phase of compounds of these substances. Corresponding methods are also known for the production of semiconducting compounds. It has been proposed to produce semiconducting two-component systems by supplying one component of the compound in alkyl form and the other as hydride, and by then forming the compound by thermal dissociation.

The present invention is predicated upon the discovery that the above-mentioned methods can be considerably improved if, for precipitation from the gaseous phase, the components of their compounds as well as the doping substances are introduced in the above-mentioned alkyl form. I have found particularly, that this new way affords the production of semiconducting compounds with more than two components in perfectly crystalline and reproducible form. Furthermore, the preparation, purification and conversion of most gaseous hydrides involves considerable difficulties. In this respect, readily volatile, easily producible alkyl compounds; which, being liquid, are conveniently purifiable by fractional distillation; are preferable to the use of hydrides. Another distinct advantage over the known methods resides in the fact that the dissociation temperatures can be kept relatively low. This applies particularly to recently developed methods of this type in which the components are supplied in the form of inorganic compounds, for example halogen compounds. The method according to the invention is further suitable for the production of semiconducting compounds in pulverulent form. In this case, the process is started with component compounds which tend to become thermally dissociated at approximately the same temperatures which temperatures are below the normal-pressure boiling point of the compounds. In this embodiment of the invention, at least one of the component compounds is used in the liquid phase, and the other components are gaseous and are introduced into the liquid phase. Both phases are brought at least to the dissociation temperature of the thermally most stable compound. The powder of the semiconducting compound, which then precipitates, is separated. The doping substances can be supplied in the liquid and/or gaseous phase.

This embodiment of the method according to the invention is of particular significance for the production of starting powders in the powder-metallurgical manufacture of semiconductor members which recently has become important, particularly for the production of thermoelectric materials.

Aside from the above-mentioned advantages of the individual embodiments of the method according to the invention, all embodiments also have the following advantages in common:

The use of alkyls as starting compounds leads to particularly pure compounds because the production of these compounds is accompanied with a considerable purifying effect; therefore, the embodiment of the method in which all components of the compound to be produced are supplied as alkyls, is particularly advantageous. In addition, these alkyls can be further purified in a relatively simple manner, e.g., distillation. The relatively low dissociation temperature of the alkyls already mentioned above, affords considerable advantages with all embodiments of the invention, which is due, among other things, to the fact that the required processing equipment can be kept relatively simple thereby reducing contamination from the apparatus. Furthermore, the thermal reduction of the alkyls and the synthesis of the compounds is accompanied by electronically negligible, non-corrosive and substantially inert by-products only such as hydrocarbons and hydrogen.

Another advantage of the invention resides in a particularly simple and very accurately definable doping of the semiconducting compound during production thereof. The relatively low synthesis temperature permits homogeneous over-doping which is of great importance for special purposes, for example the manufacture of tunnel diodes. Above all, it is also possible to perform the doping discontinuously in a very simple manner to thus obtain a non-homogeneous doping with extremely abrupt junctions, for example p-n, p-n-p or n-p-n junctions. This, too, is important for numerous applications, e.g., the production of tunnel diodes.

The above-mentioned properties and advantages of the method according to the invention render it particularly suitable for the production of semiconducting compounds of the type $A^{III}B^{V}$ (German Patent 970,420; U.S. Patent 2,798,989 of Welker), for the production of mixed crystals (French Patent 1,136,711; U.S. Patent 2,858,275 of Folberth), or the production of ternary substitutes of such compounds (German Patent 1,044,980) or of mixed crystals formed of $A^{III}B^{V}$ compounds and their ternary substitutes (French Patent 1,238,050, copending U.S. application Ser. No. 856,087, now U.S. Patent No. 3,140,-998), in each case either with homogeneous or non-homogeneous doping.

The method of the invention will be further described with reference to the drawing and two processing examples.

FIG. 1 of the drawing shows schematically an apparatus for performing the method according to the invention for precipitation of the semiconducting compound in compact form.

FIG. 2 shows schematically an apparatus for performing the method of the invention for obtaining the semiconductor compound in pulverulent form.

The apparatus according to FIG. 1 comprises a quartz vessel 11 submerged in a heater tank 12 filled with paraffin oil 13. Connected to the cover of the sealed vessel 11 is a reflux condenser with a suction outlet nipple at its upper end. The cover of vessel 11 is further provided with two stoppered inlet openings 15. Mounted in the center of the reaction vessel 11 is a quartz cylinder 16 which encloses a heater helix 17 for inner heating. The reaction mixture is shown at 18. For simplification, the connecting nipples for scavenging with protective gas, and for supplying component compounds or doping substances and the like are not illustrated.

For production of an $A^{III}B^V$ compound in compact form, an apparatus as described above with reference to FIG. 1 is supplied with alkyls of the components, these alkyls being used in highly purified condition obtained by fractional distillation. The alkyls are, for example of the type $Me^{III}R_3$ and $Me^V R_3$, preferably in a molar ratio 1:1. The vessel in which the alkyl mixture is placed is kept under an inert gaseous atmosphere, e.g., nitrogen or argon. Denoted by $Me^{III}$ and $Me^V$ are the respective elements of the third and fifth groups of the periodic system and denoted by $R_3$ is a trialkyl radical. In lieu of alkyls, their derivatives may also be employed. This includes, for example, compounds in which the alkyl radical is partially substituted, for example by hydrogen or by a halogen, i.e., the derivatives may be of the type $Me^{III}R_2X$ or $Me^V R_2X$, wherein X denotes hydrogen or a halogen. Depending on higher or lower temperatures they are colorless liquids or colorless crystalline bodies. Under reduced pressure, for example in a water-jet vacuum, the compounds are caused to slowly evaporate continuously by supplying heat with the aid of the heating bath 13, and the vapor mixture is thermally dissociated at the hot quartz cylinder 16 to the compound $Me^{III}Me^V$ hydrocarbons and hydrogen. The semiconductor compound $Me^{III}Me^V$ grows in compact and crystalline form on the quartz cylinder 16, whereas the other readily volatile dissociation products are continuously pumped away through the outlet nipple of condenser 14. By suitably adjusting the temperature of the condenser 14, the exhaust of not yet dissociated alkyls is prevented, thus securing a high yield. Cooling traps may be inserted into the vacuum path for recovery of volatile metal alkyls and hydrocarbons.

In lieu of the heated quartz cylinder 16, other heatable bodies of any desired surface configuration may be used as carriers for the precipitating semiconductor compound, these bodies consisting of any material sufficiently inert to the alkyls and the $A^{III}B^V$ compounds. In particular, the growth of precipitating material may be effected upon a semiconducting crystalline seed, preferably of the same structure and/or the same crystalline orientation as the semiconducting compound to be produced. Furthermore, the precipitation may occur in bodies of different shape such as in a tubular structure.

After termination of the precipitation, the precipitated body is cooled in vacuum or in a current of inert gas and is, thereafter, cleaned with highly pure benzene, n-hexane or other suitable solvent to remove any alkyls that may adhere to the body. It is advisable not to carry the precipitation process to the point of of complete consumption of the component mixture, because any impurities in the alkyl component mixture would accumulate in the residue portion. By tempering in known manner, the structure or texture of the grown semiconductor material can be modified, or superficial doping performed. Furthermore, the quartz cylinder 16 can be again heated to a temperature high enough to cause the compound to melt off, which compound can then be fabricated into the desired form.

To dope the semiconductor compound an addition of doping substances in form of alkyls or other compounds or directly in form of elements is added to the starting alkyl mixture in the desired quantity.

The precipitation conditions, particularly the dissociation temperatures employed, the partial vapor pressures of the compounds as well as the geometric conditions, for example the spatial position of the surfaces on which the semiconductor crystals are being grown, can be varied within wide limits thereby influencing considerably the physical properties of the precipitated semiconductor compound.

The general processing examples described above for the production of $A^{III}B^V$ compounds in compact form is supplemented hereinbelow by numerical examples.

*Example 1*

26.1 g. triethylgallium and 34.8 g. triethylantimony were introduced together into the reaction vessel and were subjected at a heating-bath temperature of 30° C. to a water-jet vacuum of 14 mm. Hg. Over a period of 21 hours 24.0 g. of galliumantimonide was precipitated in crystalline form on the quartz cylinder which was heated to 310° C. This corresponds to a yield of approximately 75%.

*Example 2*

7.4 g. equimolar triethylindium and triethylantimony mixtures were introduced into the reaction vessel and subjected to a water-jet vacuum of about 15 mm. Hg. The heat radiation from the quartz cylinder, which was heated to about 400° C., caused the oil in the heating bath in turn to become heated to a temperature of about 40 to 50° C. and thereby evaporated the alkyls within the vessel. After a processing period of 4 hours, 3.8 g. indiumantimonide was precipitated onto the quartz cylinder. This corresponds to a yield of 89.6%. The perfect crystalline form of the precipitation was confirmed by X-ray structural analysis.

*Example 3*

The coordination compound $(C_2H_5)_3Ga:Sb(C_2H_5)_3$ was obtained by mixing together equimolar quantities of triethylgallium and triethylantimony. This compound freezes at −62° C. and boils at +172° C. This compound was heated to 172° C. and thus vaporized under normal pressure. The vapor was supplied into a quartz-tube furnace where in the quartz glass tubular surfaces were heated to a temperature from 300 to 400° C. At the heated surfaces, the compound was thermally reduced to blue-gray gallium antimonide and hydrocarbons. The evaporation can be carried out with the same result in vacuum at 70° C. Sintered aluminum oxide or magnesium oxide are also suitable as surface material for reduction of the coordination compound. Irrespective of the temperature, rough surfaces are more rapidly coated with the dissociation product than smooth surfaces; therefore, the above-mentioned sintered aluminum oxide or magnesium oxide surfaces become coated more rapidly than quartz glass.

In the embodiment of equipment shown in FIG. 2, the reaction vessel proper is denoted by 21. This vessel may consist of quartz. It is mounted within a heating tank 22 filled with a heating bath 23. Connected to the processing vessel 21 is a reflux condenser with a suction outlet nozzle at the top. The processing vessel is further provided with a stoppered inlet nipple 25. Mounted in the vessel is a stirring device 26. The tank 22 is equipped with a spiral-shaped heater 27 for heating the liquid 23. The processing vessel 21 has a downward tubular extension coupled through a Teflon hose 28 with a precipitation vessel 29. Vessel 29 can be separated from vessel 21 by means of clamp 30. For simplicity of illustration, the connections for evacuation, rinsing by protective gas, supply of component compounds or doping substances in the gaseous phase are omitted from FIG. 2.

Semiconductor $A^{III}B^V$ compounds in pulverulent form are produced as follows. The components of the semiconductor compounds are initially supplied as alkyl compounds or their derivatives (defined as hereinabove), which tend to become thermally dissociated at approximately the same temperatures, which temperatures are below the normal-pressure boiling point of the compounds, said compounds being liquid when brought together. By heating the liquid mixture at least to the dissociation temperature of the thermally more stable alkyl compounds, the $A^{III}B^V$ compounds precipitate in fine pulverulent form. Some of said compounds can be introduced in gaseous phase. The reaction is carried out in an inert gas flow thus preventing ingress of moisture and atmospheric oxygen. The specifically heavier $A^{III}B^V$ powder drops into the tubular downward extension of the reaction vessel 21 through 28 into vessel 29 when clamp 30 is opened. This permits the ready separation from time to time of the powder collecting at the lower end of the extension. It also affords the assurance that the compound powder will not remain in the hot reaction zone for an unnecessarily long period of time.

It is advisable to place into the precipitation vessel 29, a suitable washing liquid such as benzene, toluene or n-hexane, so that any adhering reaction residues are removed from the compound powder. The powder thus produced and subsequently dried under complete exclusion of atmospheric oxygen is particularly suitable for the production of semiconducting sintered bodies.

Doping is applied in the same manner as described above with reference to the embodiments relating to FIG. 1.

The general examples of the invention described above for the production of $A^{III}B^V$ compounds in pulverulent form are supplemented hereinbelow by numerical examples.

*Example 4*

26.8 g. of an equimolar mixture of triisobutylgallium and triisobutylantimony were introduced into the reaction vessel and heated to 200° C. by the heating bath. The thermal dissociation of the alkyl mixture had already commenced at 169° C. and occurred at this temperature at a favorable rate, about 9.5 g. per hour. It resulted in a pyrophoric GaSb powder which was confirmed by X-ray analysis. The yield was practically quantitative.

*Example 5*

9.9 g. of an equimolar triisobutylaluminum and triisobutylantimony mixture were placed into the reaction vessel under inert gas and dissociated by heating to 270° C. After a reaction period of two hours, a finely distributed pyrophoric AlSb powder was obtained in virtually quantitative amounts.

*Example 6*

24 g. triisobutylgallium were heated in an oil bath to 180 to 200° C. Into the alkyl, which at this temperature is being thermally dissociated, a colorless solution of phosphorus in benzene (about 2 to 3 g. phosphorus in 0.1 liter benzene) was dropwise added. While the benzene immediately boils out at this temperature and hence immediately evaporates and is condensed with the aid of a condenser within a collector vessel, the elemental phosphorus becomes converted with the gallium, which is present in a nascent state, to GaP powder. The yield was 7.9 g. The elemental gallium excess which was present along with the galliumphosphide, was eliminated, after washing the precipitate with a solvent selected from benzene n-hexane and/or ether by heating in half-concentrated hydrochloric acid. There remained an orange-colored powder which was found to be well crystallized galliumphosphide, by X-ray diffraction analysis.

In the same manner the invention described above is suitable for the production of other semiconducting compounds such as $Bi_2Te_3$. In this case—for example—a mixture 2:3 of evaporated triethylbismuth and diethyltellurium was introduced in the reaction vessel. It results by precipitation a black-grey pyrophoric $Bi_2Te_3$ powder, found by X-ray diffraction analysis.

Obviously, many modifications and variations of the present invention are possible in the light of the above teachings. It is therefore to be understood that within the scope of the appended claims, the invention may be practiced otherwise than as specifically described.

I claim:

1. A method of producing an $A^{III}B^V$ semiconductor compound, comprising introducing alkyl compounds of said components into a reaction vessel and thermally dissociating said alkyl compounds to form said $A^{III}B^V$ semiconductor compound by heating said compounds at least to the dissociation temperature of the thermally more stable compound.

2. A method of producing an $A^{III}B^V$ semiconducting compound having at least two components, which comprises preparing a liquid mixture of an alkyl compound of at least one of said components, and the remainder of said components and doping substances being in the form selected from the group consisting of halogenide and elemental forms, heating said liquid mixture to form a vaporous phase and thermally dissociating said gaseous phase by heating said gaseous phase at least to the dissociation temperature of the most thermally stable compound of said mixture.

3. A method of producing a semiconducting compound having at least two components, which comprises separately gasifying alkyl compounds of said components, mixing said gasified compounds and thermally dissociating said gaseous phase by heating said gaseous phase at least to the dissociation temperature of the most thermally stable compound of said mixture.

4. A method of producing a semiconducting compound having at least two components, which comprises reacting alkyl compounds of said components, said compounds tending toward thermal dissociation at approximately the same temperature, which temperature is below the normal pressure boiling point of said compounds, at least one of said compounds being used in liquid phase, the remainder of said compounds being in gaseous phase and introduced into said liquid phase, both of said phases being brought to at least the dissociation temperature of the most thermally stable compound, whereby semiconducting compound precipitates as a powder.

5. A method of preparing galliumantimonide which comprises mixing liquid triethylgallium and liquid triethylantimony in about a 1:1 ratio, evaporating the mixture to produce a gaseous phase and heating said gaseous phase to a temperature of about 310° C. whereby gallium-antimonide is thermally precipitated.

6. A method of preparing indiumantimonide which comprises introducing liquid triethylindium and liquid triethylantimony in about a 1:1 molar ratio into a closed reaction vessel, bringing a heating surface located within said vessel to a temperature sufficiently high to cause the liquid triethylindium and triethylantimony mixture to evaporate and thermally dissociate the resulting vapor on said heating surface.

7. A method of preparing galliumantimonide which comprises mixing about equimolar quantities of trialkylgallium and triethylantimony to form a liquid mixture, vaporizing said liquid mixture to produce a vapor, introducing said vapor into a reaction vessel containing therein a heating surface, raising the temperature of said heating surface to a value sufficiently high to thermally dissociate said vapor and to precipitate galliumantimonide on said heating surface.

8. A method of preparing aluminumantimonide which comprises introducing a reaction mixture of triisobutylaluminum and triisobutylantimony into a reaction vessel, heating said reaction mixture within said reaction vessel to 270° C. whereby pyrophoric aluminumantimonide thermally precipitates.

9. A method of preparing galliumphosphide which comprises heating a reaction vessel charged with triisobutylgallium to about 190° C., then introducing a benzene solution of phosphorus into said reaction vessel whereby a mixed precipitate of galliumphosphide and gallium are thermally produced, washing said mixed precipitate and thereafter heating said washed mixed precipitate with half-concentrated hydrochloric acid to leave a residue of galliumphosphide.

10. Apparatus for producing a semiconductor compound of two or more components, which consists of a reaction chamber, submerged within a heater tank filled with a heating fluid, a cover to said reaction chamber, a reflux condenser having a suction outlet at its upper end connected to the cover of said reaction vessel, a quartz cylinder mounted through said cover and extending into said reaction vessel, a heater located within said quartz cylinder inlet and outlet openings in said cover.

11. Apparatus for producing a semiconductor compound of two or more components, which consists of a reaction chamber, submerged within a heater tank filled with a heating fluid, said reaction vessel being provided with a stoppered inlet nipple, a downward tubular extension of said reaction vessel extending through said heater tank and connected by a valved coupling to a precipitation vessel, and an axially aligned stirring device mounted within said reaction vessel and extending into said downward tubular extension.

References Cited
UNITED STATES PATENTS

| | | | |
|---|---|---|---|
| 2,020,298 | 11/1935 | Carothers et al. | 23—259 |
| 2,464,685 | 3/1949 | Hirsch | 23—285 |
| 2,980,500 | 4/1961 | Miller | 23—50 |
| 3,010,792 | 11/1961 | Didchenko | 23—204 |

OSCAR R. VERTIZ, *Primary Examiner.*

MILTON WEISSMAN, JOSEPH R. LIBERMAN,
*Examiners.*

H. S. MILLER, R. D. EDMONDS, *Assistant Examiners.*